United States Patent
Osborne et al.

(10) Patent No.: US 9,594,970 B2
(45) Date of Patent: Mar. 14, 2017

(54) DEVICE WITH CAMERA AT OR NEAR JUNCTION OF FIRST PANEL AND SECOND PANEL

(71) Applicant: Lenovo (Singapore) Pte. Ltd., New Tech Park (SG)

(72) Inventors: Christopher Miles Osborne, Cary, NC (US); Michael William Stuart Ripp, Raleigh, NC (US); Daniel Jordan Schantz, Raleigh, NC (US); Wesley Abram Luttrell, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 86 days.

(21) Appl. No.: 14/471,408

(22) Filed: Aug. 28, 2014

(65) Prior Publication Data
US 2016/0063338 A1    Mar. 3, 2016

(51) Int. Cl.
*G06K 9/20* (2006.01)
*H04N 1/00* (2006.01)
*H04N 1/387* (2006.01)
*G06F 1/16* (2006.01)
*G06K 9/00* (2006.01)

(52) U.S. Cl.
CPC .......... *G06K 9/209* (2013.01); *G06F 1/1686* (2013.01); *H04N 1/00204* (2013.01); *H04N 1/00525* (2013.01); *H04N 1/00557* (2013.01); *H04N 1/00559* (2013.01); *H04N 1/387* (2013.01); *G06K 9/00463* (2013.01); *H04N 2201/0084* (2013.01)

(58) Field of Classification Search
USPC .......... 348/207.1–207.11, 373–376; 396/419–428; 361/683, 679.21, 679.26, 361/679.27
See application file for complete search history.

(56) References Cited

U.S. PATENT DOCUMENTS

| | | | | |
|---|---|---|---|---|
| 5,801,919 A * | 9/1998 | Griencewic | .......... | G06F 1/1686 348/552 |
| 6,141,052 A * | 10/2000 | Fukumitsu | ............ | G06F 1/1616 348/14.08 |
| 6,201,554 B1 * | 3/2001 | Lands | ................... | G06F 1/1626 345/156 |
| 6,590,764 B2 * | 7/2003 | Silverstein | ............ | G06F 1/1626 206/320 |
| 6,812,958 B1 * | 11/2004 | Silvester | ............... | G06F 1/1607 348/207.1 |
| 6,933,981 B1 * | 8/2005 | Kishida | .............. | H04N 1/00249 348/207.1 |

(Continued)

OTHER PUBLICATIONS

Kwan, Michael "Get the Oppo N1 Android Smartphone for Only $99", Oct. 15, 2013, http://www.mobilemag.com/2013/10/15/get-oppo-n1-android-smartphone-99/.

(Continued)

*Primary Examiner* — Michael Osinski
(74) *Attorney, Agent, or Firm* — John L. Rogitz; John M. Rogitz

(57) ABSTRACT

In one aspect, a device includes a first panel at least bearing a keyboard, a second panel at least bearing a display and which is coupled to the first panel at least at a junction, and at least one camera disposed on the device at or near the junction of the first panel and the second panel.

20 Claims, 7 Drawing Sheets

(56) References Cited

U.S. PATENT DOCUMENTS

| | | | |
|---|---|---|---|
| 7,019,784 B1* | 3/2006 | Shibuya | G06F 1/1616 348/207.1 |
| 7,391,443 B2* | 6/2008 | Kojima | H04N 5/232 348/231.99 |
| 7,450,834 B2* | 11/2008 | Makii | G02B 7/026 367/165 |
| 7,903,143 B2* | 3/2011 | Seddik | H04N 5/2256 348/207.99 |
| 7,903,171 B2* | 3/2011 | Takabatake | G06F 1/1616 348/376 |
| 7,986,368 B2* | 7/2011 | Lin | G06F 1/3231 348/333.01 |
| 8,134,638 B2* | 3/2012 | Wang | G06F 1/1616 348/373 |
| 8,619,172 B2* | 12/2013 | Senatori | G06F 1/1616 348/333.01 |
| 8,810,719 B2* | 8/2014 | Hsu | G06F 1/3231 348/333.13 |
| 8,866,840 B2* | 10/2014 | Dahl | G06F 1/1616 345/1.3 |
| 2001/0004269 A1* | 6/2001 | Shibata | H04M 1/021 348/333.06 |
| 2002/0191102 A1* | 12/2002 | Yuyama | H04N 5/2256 348/370 |
| 2003/0228847 A1* | 12/2003 | Matsumoto | H04M 1/0212 455/90.3 |
| 2004/0017479 A1* | 1/2004 | Nakakubo | H04N 5/2251 348/207.99 |
| 2004/0048633 A1* | 3/2004 | Sato | H04M 1/0214 455/556.1 |
| 2004/0056964 A1* | 3/2004 | Kawai | H04N 5/23206 348/211.1 |
| 2005/0047773 A1* | 3/2005 | Satake | H04M 1/0214 396/301 |
| 2005/0073155 A1* | 4/2005 | Weng | G06F 1/1616 292/138 |
| 2005/0134717 A1* | 6/2005 | Misawa | H04M 1/0218 348/333.06 |
| 2005/0225667 A1* | 10/2005 | Yamakose | H04N 5/2253 348/373 |
| 2005/0263600 A1* | 12/2005 | Yang | G06F 1/1616 235/472.01 |
| 2005/0276009 A1* | 12/2005 | Kim | G06F 1/1616 361/679.27 |
| 2006/0044396 A1* | 3/2006 | Miyashita | H04N 5/2252 348/207.99 |
| 2006/0061962 A1* | 3/2006 | Oakley | G06F 1/1601 361/679.23 |
| 2006/0268157 A1* | 11/2006 | Chang | H04N 5/2252 348/373 |
| 2008/0080846 A1 | 4/2008 | Grip | |
| 2008/0205874 A1* | 8/2008 | Chen | G03B 17/02 396/419 |
| 2009/0002548 A1* | 1/2009 | Liang | H04N 1/00519 348/373 |
| 2009/0231483 A1* | 9/2009 | Seddik | H04N 5/2256 348/373 |
| 2010/0020182 A1* | 1/2010 | Wang | G03B 17/00 348/207.1 |
| 2011/0069180 A1* | 3/2011 | Nijemcevic | G06K 9/3216 348/207.1 |
| 2011/0081948 A1* | 4/2011 | Shirai | G06T 11/60 455/556.2 |
| 2012/0013584 A1* | 1/2012 | Senatori | G06F 1/1686 345/207 |
| 2012/0062729 A1* | 3/2012 | Hart | G06F 1/1626 348/135 |
| 2013/0148002 A1* | 6/2013 | Kim | H04N 5/23293 348/333.08 |
| 2014/0028860 A1* | 1/2014 | Ichikawa | G06F 3/005 348/207.1 |
| 2014/0139667 A1 | 5/2014 | Kang | |
| 2015/0288923 A1 | 10/2015 | Kim et al. | |
| 2015/0363153 A1 | 12/2015 | Kato et al. | |
| 2015/0365590 A1* | 12/2015 | Ishizuka | G03B 9/64 348/211.99 |
| 2016/0028945 A1* | 1/2016 | Kraft | H04N 5/23222 348/207.1 |

OTHER PUBLICATIONS

Dent, Steve "Gionee Elite E7 mini launched with Oppo-like swivel camera, octa-core CPU", Retrieved on Jul. 25, 2014, http://www.engadget.com/2013/12/25/gionee-elite-e7-mini-launch/.

Grifori Zaitsev, Scott Wentao Li, "Usage of First Camera to Determine Parameter for Action Associated with Second Camera" related pending U.S. Appl. No. 14/711,563, non-final office action dated Jun. 3, 2016.

Grifori Zaitsev, Scott Wentao Li, "Usage of First Camera to Determine Parameter for Action Associated with Second Camera" related pending U.S. Appl. No. 14/711,563, applicant's response to non-final office action filed Aug. 26, 2016.

* cited by examiner

DEVICE WITH CAMERA AT OR NEAR JUNCTION OF FIRST PANEL AND SECOND PANEL

FIELD

The present application relates generally to cameras on devices bearing a first panel including a keyboard and a second panel including a display.

BACKGROUND

Current document imaging devices, which sometimes resemble so-called overhead projectors, are often heavy, unmanageable, not easily transported, and furthermore are dedicated only to the single function of imaging documents. The present application recognizes the above shortcomings of current document imaging devices.

SUMMARY

Accordingly, in one aspect a device includes a first panel at least a keyboard, a second panel at least bearing a display and which is coupled to the first panel at least at a junction, and a camera disposed on the device at least substantially at the junction of the first panel and the second panel.

In another aspect, a method includes providing a device comprising a first panel at least bearing a keyboard and a second panel at least bearing a display. The second panel is coupled to the first panel using a hinge. The method also includes providing a camera which is disposed on the hinge.

In another aspect, a device includes a first rectangular panel at least bearing a keyboard, is second rectangular panel at least bearing a display and which is coupled to the first panel at a junction, a first camera disposed on the second rectangular panel at a first longitudinal side of the second rectangular panel opposite a second longitudinal side of the second rectangular panel bordering the junction, and a second camera disposed at least substantially at the junction.

The details of present principles, both as to their structure and operation, can best be understood in reference to the accompanying drawings, in which like reference numerals refer to like parts, and in which:

DETAILED DESCRIPTION

Figure 1:
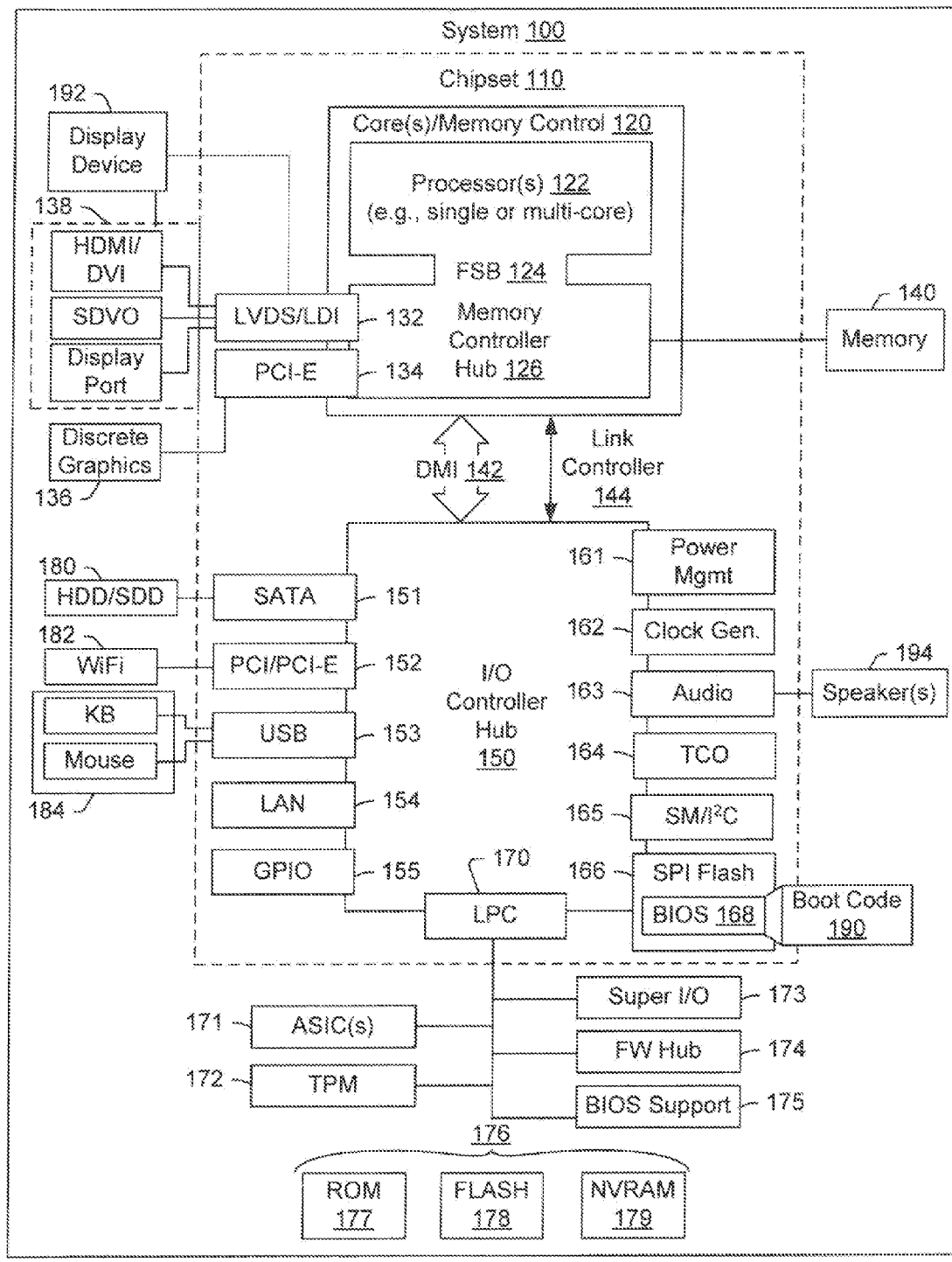
FIG. 1 is a block diagram of an example system in accordance with present principles.

The disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over as network such as the Internet, a local intranet, or a virtual private network.

As used herein, instructions refer to computer-implemented steps for processing information in the system. Instructions can be implemented in software, firmware or hardware, hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or an combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, cart be written in an appropriate language such as but not limited to C# or C++, can be stored on or transmitted through a computer-readable storage medium that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the commuter readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc of Morrisville, N.C., or a workstation computer, such as the Yoga™ series of convertible computers or a ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and "southbridge").

The core and memory control group 120 include one or more processors 122 (e.g., single core of multi-core, etc.) and a memory controller hub 126 that exchange information via a front side bus (FSB). As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is s often referred to as "system memory."

The memory controller hub 126 further includes a low-voltage differential signaling interface (LVDS) 132. The LVDS 132 may be a so-called LVDS Display Interface (LDI) for support of a display device 192 (e.g. a CRT, a flat panel, a projector, a touch-enabled display, etc.). A block 137 includes some examples of technologies that may be supported via the LVDS interface 132 (e.g., serial digital video, HDMI/DVI, display port). The memory controller be 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more CPUs). An example system may include AGP or PCI-E for support of graphics.

The I/O hub controller 150 includes a variety of interface. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub contract 150 provide for communication with various devices, networks, etc. For example, the SATA interface 151 provides for reading, writing or reading and writing information on one or more drives 180 such as HDDS, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
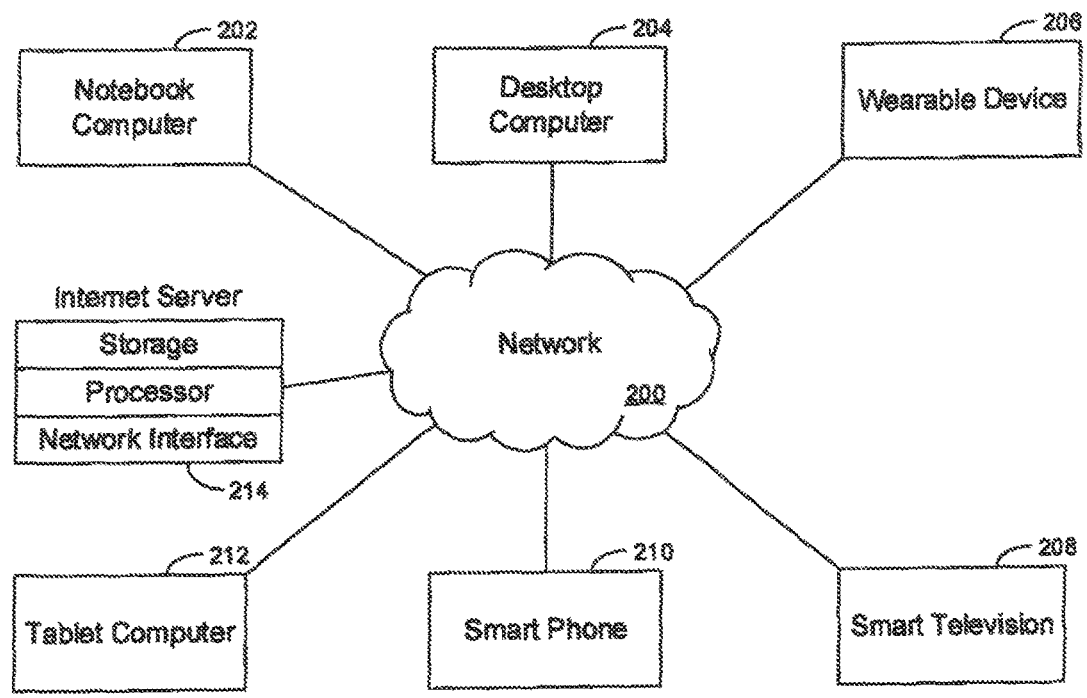
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
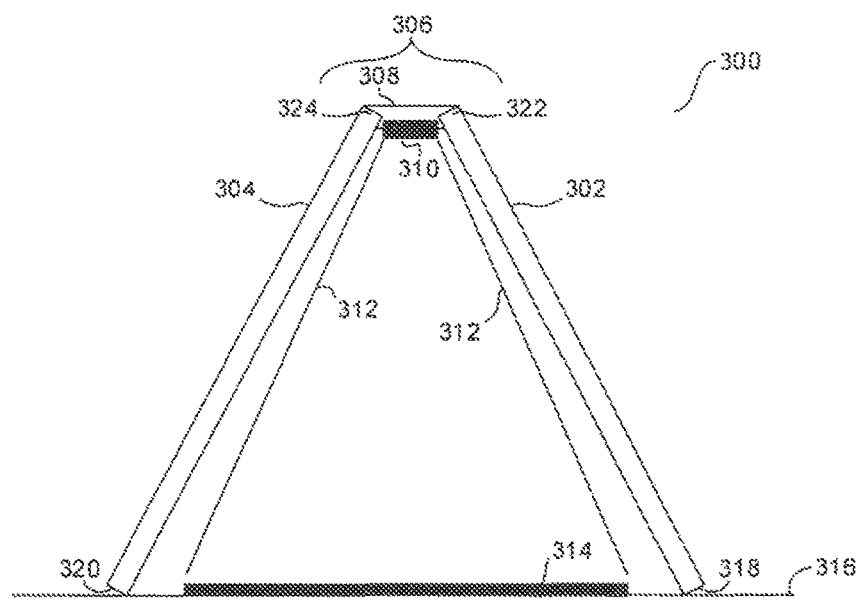
FIGS. 3-7 are side elevational views of example devices in accordance with present principles.

Referring now to FIG. 3, it shows a side elevational view of a convertible device 300 in accordance with present principles, which may include e.g. some or all of the components described above in reference to the system 100. The device 300 includes a first panel 302 at least bearing a keyboard e.g. on a surface of the panel 302 which as shown in FIG. 3 is understood to face a second panel 304. The second panel 304 at least bears a display e.g. on a surface of the panel 304 which as shown in FIG. 3 is understood to face the first panel 302. Also note that the second panel 304 is coupled to the first panel 302 at least at a junction 306 of the panels, which in the present instance includes a hinge 308 which couples one of the panels 302, 304 to the other of the panels 302, 304. Although FIG. 3 is a side elevational view, it is to be understood that in some embodiments the hinge 308 may be at least substantially the same length along a longitudinal axis of the hinge 308 as respective longitudinal sides of the first panel 302 and second panel 304 (e.g. where the longitudinal sides have respective longitudinal edges 322, 324 shown from the side in FIG. 3) which respectively border the hinge 308 and e.g. which respectively couple to the hinge 308.

In any case, and still in reference to FIG. 3, note that the device 300 also includes a camera 310 disposed at the junction 306 e.g. and specifically on the hinge 308, and although not shown owing to the side elevational view of FIG. 3 in which the camera 310 is shown as being disposed at a side of the hinge 308 for illustration, it is to be understood that in some embodiments the camera 310 may be disposed midway along hinge 308 relative to its longitudinal axis such that it is e.g. between respective opposing ends of the hinge 308 defined by its longitudinal axis (e.g. note that only one such end of the hinge 308 is shown in FIG. 3). Furthermore, lines 312 shown in FIG. 3 show the field of view of the camera 310 e.g. as controlled using a processor of the device 300. Thus, the field of view as represented by the example lines 312 encompass a document 314 on a surface 316 under the device 300 on which the device 300 has been placed, where the document 314 is to be imaged by the device. Note that in some embodiments the field of view may be e.g. dynamically controlled by the device 300 to this direct the camera 310 to gather an image mostly if not entirely of the document 314 (e.g. at least in part based on object and/or document recognition) such that portions of the surface 316 surrounding the document are not included in the image.

Figure 4:
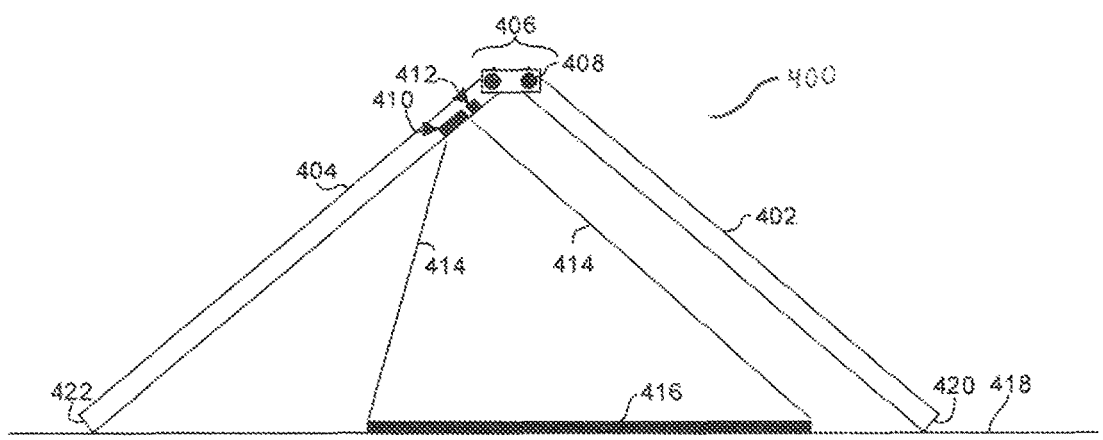

Before moving on to FIG. 4, it is to be understood that the configuration of the device 300 as shown in FIG. 3 establishes an A-frame (e.g. without the cross-bar as often evident in to typewritten capital letter "A") e.g. once the device 300 has been transitioned to the "tent" configuration shown by a user and placed on the surface 316 as shown. More specifically, when the device 300 is placed down on the surface 316 with respective edges 318, 320 of the first and second panels 302, 304 (which are opposite respective edges 322, 324 of the first and second panels 302, 304 shown from the side in FIG. 3, where the edges 322, 324 each border the junction 306 (e.g. and specifically may be respectively coupled to the hinge 308)) placed against the surface 316, the device 300 establishes an A-frame when viewed (e.g. upright from the side) relative to the surface. Thus, when the device 300 is placed on a surface as shown, the camera 310 at least substantially faces the surface 316 and hence the document 314 thereon which is to be imaged.

Further, in addition to establishing mini A-frame in at least one respect, it may also be appreciated that the device 300 when arranged and/or configured as shown may resemble the capital version of the Greek letter lambda. Also note that when the device 300 is arranged and/or configured as shown this may establish what is referred to below as a "tent configuration" of the device owing to it resembling the basic outline of a tent.

Last before moving on to FIG. 4, note that even though not shown, a light source (e.g. a "flash") may also be provided on the device 300 proximate to the camera 310 for illuminating the document 314 when gathering an image thereof using the camera 310.

Continuing the detailed description in reference to FIG. 4, it shows a side elevational view of a convertible device 400 in accordance with present principles, which may include e.g. some or all of the components described above in reference to the system 100. The device 400 includes a first panel 402 at least bearing a keyboard e.g. on a surface of the panel 402 which as shown in FIG. 4 is understood to face a second panel 404. The second panel 404 at least bears a display e.g. on a surface of the panel 404 which as shown in FIG. 4 is understood to face the first panel 402. Also note that the second panel 404 is coupled to the first panel 402 at least at a junction 406 of the panels, which in the present instance includes a hinge 408 which couples one of the panels 402, 404 to the other of the panels 402, 404. Although FIG. 4 is a side elevational view, it is to be understood that in some embodiments the hinge 408 may be at least substantially the same length along a longitudinal axis of the hinge 408 as respective longitudinal sides of the first panel 402 and second panel 404 (e.g. where the longitudinal sides have respective longitudinal edges e.g. coupled to the hinge 408) which respectively border the hinge 403.

Still in reference to FIG. 4, note that the device 400 also includes a camera 410 disposed at an edge of the second panel 404 at least in part establishing the junction and/or at which the panel 404 is coupled to the hinge 403. Note that although in the example of FIG. 4 the camera 410 is shown as being disposed at or near a first edge of the panel 404 that establishes the junction and also along a second edge of the panel 404 orthogonal to the first edge where the second edge is the one shown from the side elevational view as running down to up, left to right, in other embodiments the camera 410 may be disposed along the first edge in part establishing the junction 406 and/or coupled to the hinge 408 e.g. midway along hinge 408 relative to its longitudinal axis such that it is e.g. between respective opposing ends of the hinge 408 defined by its longitudinal axis (e.g. note that only one such end of the hinge 406 is shown in FIG. 4).

In any case, note that a light source 412 is also shown for illuminating (e.g. under control of a processor of the device 400) a field of view of the camera 410 e.g. as controlled using the processor of the device 400 and as represented by the example lines 414. As may be appreciated from FIG. 4, the field of view of the camera 410 encompasses a document 416 on a surface 413 under the device 400 on which the device 400 has been placed, where the document 416 is to be imaged by the device. Note that in some embodiments the field of view may be e.g. dynamically controlled by the device 400 to thus direct the camera 410 to gather an image mostly if not entirely of the document 416 (e.g. at least in part based on object and/or document recognition) such that portions of the surface 418 surrounding the document are not included in the image. In some embodiments, this may be done e.g. by the device 400 by actuating the camera 410 to gather at least one image corresponding to the field of view of the camera 410, identifying the document 416 from the image, identifying the location and/or dimensions of the document 416 (e.g. the location of its edges), projecting light from the light source 412 to illuminate the document 416 but not illuminating other areas in the field of view of the camera 410, and gathering at least one more image of the document 416 in which the document 416 is illuminated.

Figure 5:
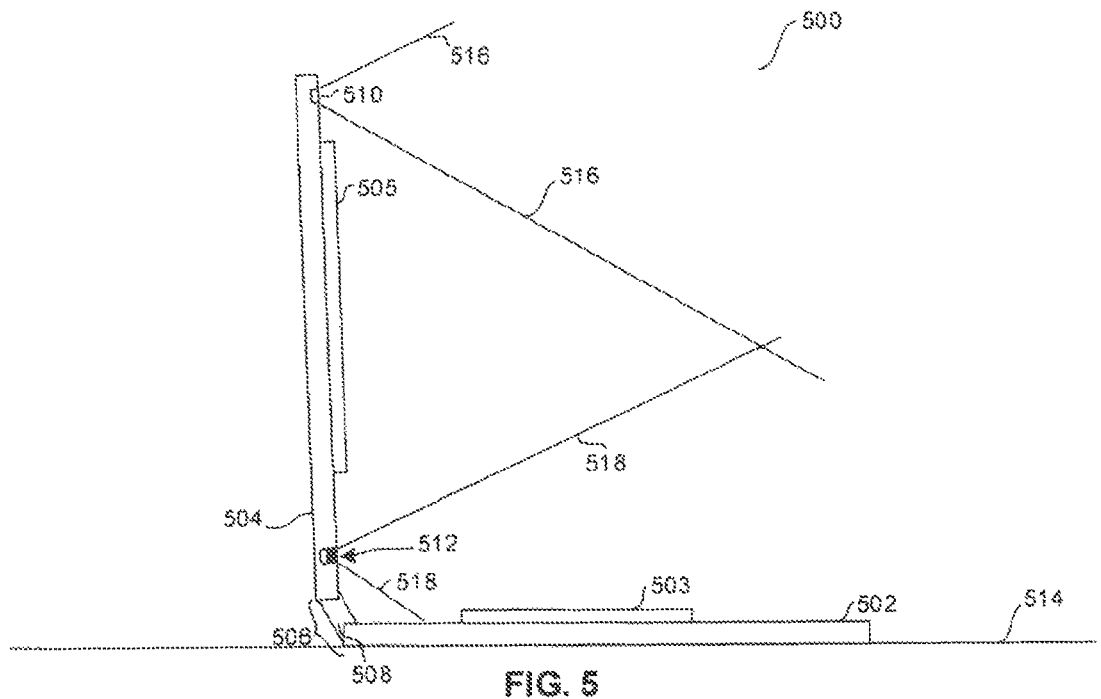

Before moving on to FIG. 5, it is to be understood that the configuration of the device 400 as shown in FIG. 4 establishes an A-frame (e.g. without the cross-bar as often evident in a typewritten capital letter "A") e.g. one the device 400 has been transitioned to the "tent" configuration shown by a user and placed on the surface 418 as shown. More specifically, when the device 400 is placed down on the surface 418 with respective edges 420, 422 of the first and second panels 402, 404 (which are opposite respective edges of the first and second panels 402, 404 shown from the side in FIG. 4 that each border the junction 406 (e.g. and specifically may be respectively coupled to the hinge 408)) placed against the surface 418, the device 400 establishes an A-frame when viewed (e.g. upright from the side) relative to the surface. Thus, when the device 400 is placed on a surface as shown, the camera 410 is directed toward the surface 418 and hence the document 416 thereon which is to be imaged.

Further, in addition to establishing an A-frame it at least one respect, it may also be appreciated that the device 400 when arranged and/or configured as shown may resemble the capital version of the Greek letter lambda. Also note that when the device 400 is arranged and/or configured as shown this may establish what is referred to below as a "tent configuration" of the device owing to it resembling the basic outline of a tent.

Figure 6:
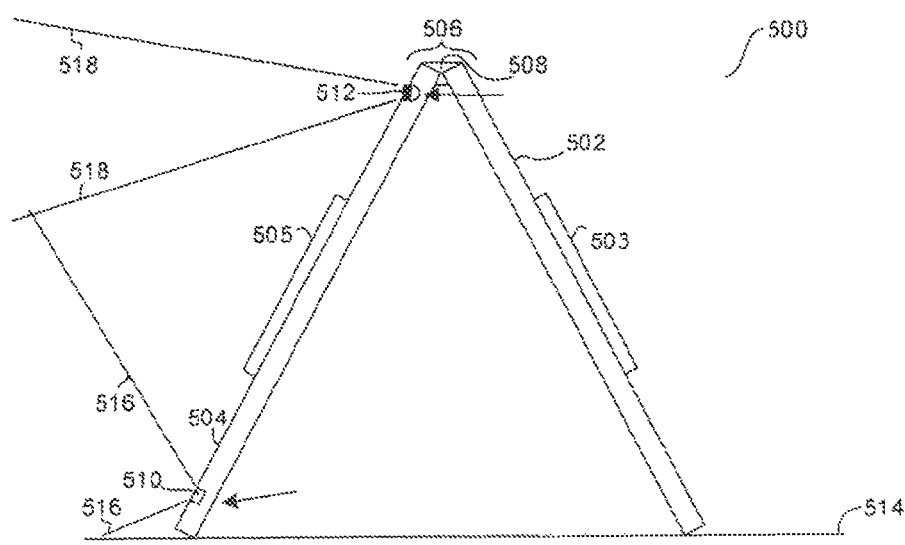
Figure 7:
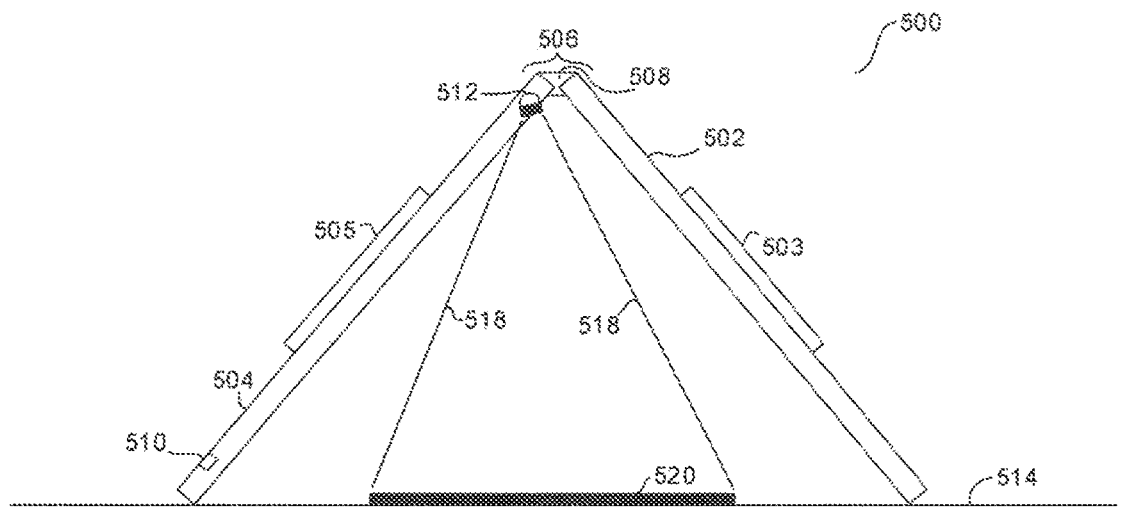

Now in cross-reference to FIGS. 5-7, they show example side elevational views of a convertible device 500 in accordance with present principles, which may include e.g. some or all of the components described above in reference to the system 100. The device 500 includes a first panel 502 at least bearing a keyboard 503 on a surface of the panel 502. A second panel 544 is shown and at least bears a touch-enabled display 505. Also note that the second panel 504 is coupled to the first panel 502 at least at a junction 506 of the panels, which in the present instance includes a hinge 508 which couples one of the panels 502, 504 to the other of the panels 502, 504. Although FIGS. 5-7 are side elevational views, it is to be understood that in some embodiments the hinge 508 may be at least substantially the same length along a longitudinal axis of the hinge 508 as respective longitudinal sides of the first panel 502 and second panel 504 which respectively border the binge 508 (e.g. where the longitudinal sides have respective longitudinal edges e.g. coupled to the hinge 508).

Furthermore, note that the device 500 includes plural cameras 510 and 512 which may be disposed on the second panel 504 (although it is to be understood that in other embodiments e.g. one or both cameras may be disposed on the hinge 508 and/or the first panel 502). It is to be understood that the cameras 510 and 512 may be respectively disposed on the panel 504 at opposing longitudinal sides thereof, which as shown in FIG. 5 are top and bottom sides of the panel 504. Thus, as may be appreciated from FIG. 5 (which shows the device 500 in a laptop configuration), if a user were looking at the display 505 from in front of the device 500 (e.g. the user being to the right of the device 500 as shown owing to FIG. 5 being a side elevational view), the opposing longitudinal sides would be the top and bottom sides of the panel 504.

Further still, at least one and optionally both of the cameras 510 and 512 may be disposed on the panel 504 via respective swivels to which the cameras 510 and 512 are coupled, where the swivels are coupled to the panel 504. However, as shown in the example of FIGS. 5-7, only the camera 512 is disposed on is swivel (e.g. represented by the partially circular pattern adjacent the camera 512 as shown) next to the junction 506. Note that a swivel in accordance with present principles is understood to be manipulable a user, and/or automatically by the device 500 itself under control of a processor of the device) to alter the orientation of the respective camera thereon relative to the orientation of the portion of the device 500 on which the swivel is disposed.

Accordingly, as shown in FIG. 5, the camera 512 disposed on a swivel has been oriented in one direction at least substantially parallel to a plane established by the panel 502, while as shown in FIG. 6 it has been oriented in a direction that is oblique relative to the panel 504 when in a first tent configuration, and while as shown in FIG. 7 it has been oriented in a direction facing toward a surface 514 on which the device 500 is placed when in a second tent configuration (e.g. with the camera 510 optionally not powered on when in the configuration of FIG. 7). Also note that in the example shown, the camera 510 in all three of FIGS. 5-7 is oriented in the same direction relative to the panel 504 on which it is disposed. Nonetheless, it is to be understood that in some embodiments the swivel on which the camera 512 is disposed may be manipulable three hundred sixty degrees about its an axis of rotation to thus rotate the camera 512 three hundred sixty degrees about the axis of rotation of the swivel. As shown in FIGS. 5 and 6, the camera 512 faces outwardly away from one side of the panel 504 bearing the display 505, while as shown in FIG. 7 the camera is facing outwardly away from an opposite side of the panel 504 than the one bearing the display 505.

Figure 8:
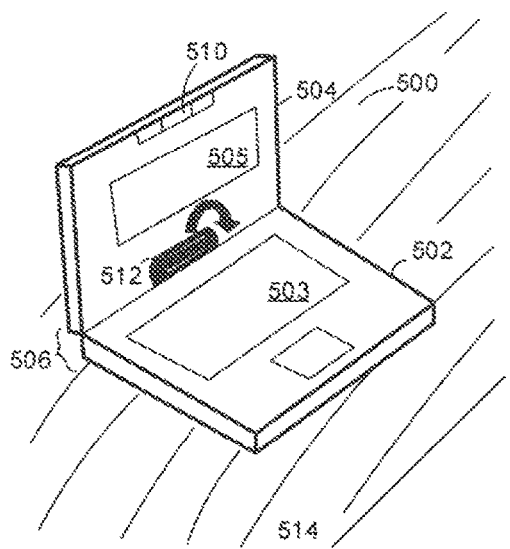
FIG. 8 is a perspective view of an example device in accordance with present principles.

Still in reference to FIGS. 5-7, it is to be understood that while the cameras 510 and 512 are shown as being at or near a side edge of the panel 504 for illustration (e.g., a left edge looking directly at the display when in the laptop configuration), they may be located e.g. midway along respective edges (e.g. top and bottom edges) that are orthogonal to such a side edge, as shown in the perspective view of FIG. 8. Thus, as may be appreciated from FIG. 8, the cameras 510 and 512 are disposed e.g. midway along top and bottom edges of the panel 504 relative to looking upright at the panel 504 when the device 500 is in the laptop configuration shown.

Further describing the device 500, it is to be understood that it may include respective light sources proximate to the cameras 510 and 512 for illuminating respective fields of view of the cameras 510 and 512, which are represented by respective lines 516 and 518 in FIGS. 5-7. As shown in FIG. 7, the field of view for the camera 512 when placed in the A-frame and/or tent configuration shown encompasses a document 520 which when the camera 512 is actuated while the device 500 is in the position shown in FIG. 7 would gather an image including the document 520.

In reference to both FIGS. 6 and 7, note that when the device 500 is placed in the A-frame and/or tent configurations shown, the display 505 faces away front panel 502. Thus, when a user is controlling the device 500 to gather an image of the document 520, the user may easily provide a command to gather an image and/or provide other input using the touch-enabled display 505 while the camera 512 is positioned to gather an image of the document 520. The user may do so e.g. by providing input using a UI such as the UI 1000 to be described below.

Figure 9:
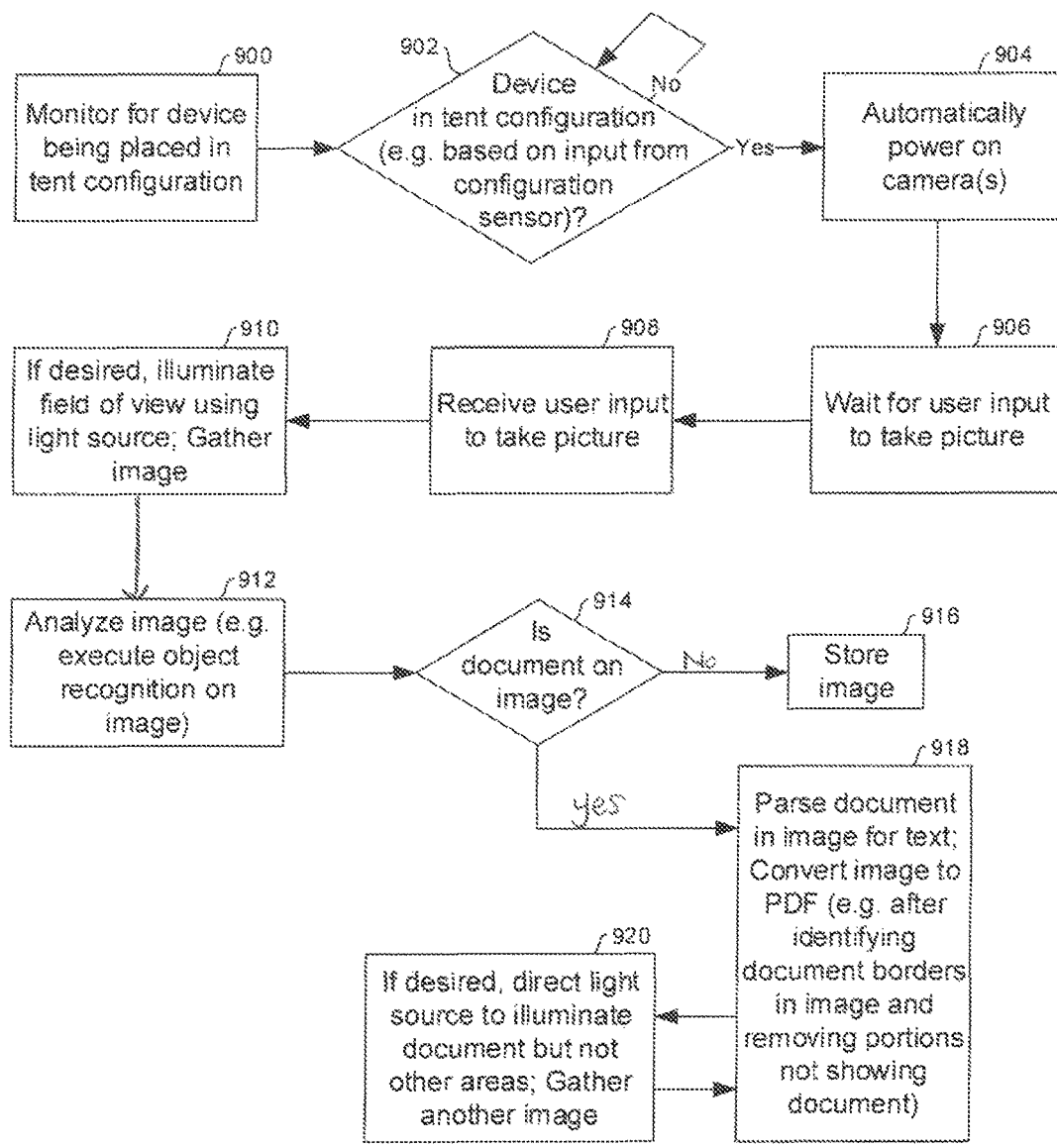
FIG. 9 is a flow chart showing an example algorithm in accordance with present principles.

Continuing now in reference to FIG. 9, it shows example logic to be undertaken by a device such as the system 100 and/or devices 300, 400, and 500 in accordance with present principles (e.g. a Lenovo Yoga series convertible computer). The logic begins at block 900 where the logic monitors for the device being placed in a tent configuration (e.g. from a tablet configuration, laptop configuration, or stand configuration). The logic may do so at block 900 based on input from a configuration sensor on the device (e.g. optical sensor and/or an electromechanical sensor) sensing the position of one portion of the device relative to another portion, and/or based on input from an accelerometer and/or gyroscope indicating that the device has been moved and to what configuration and/or orientation.

From block 900 the logic proceeds to decision diamond 902 where the logic determines whether the device has in fact been configured in a tent configuration e.g. based on input from one or more of the sensors described above. A negative determination at diamond 902 causes the logic to continue making the determination thereat until an affirmative one is made. Once an affirmative determination is made at diamond 902, the logic proceeds to block 904 where the logic e.g. automatically without user input (e.g. other than placing the device in the tent configuration) in response to the affirmative determination powers on one or more cameras on the device, such as e.g. one oriented toward a surface on which the device is placed in the tent configuration. Thus, also note that at block 904 the logic may automatically without user input (e.g. other than placing the device in the tent configuration) actuate a swivel on the device and which has a camera positioned thereon to orient the camera toward such a surface and hence toward an object (e.g. document) on the surface to be imaged.

From block 904 the logic proceeds to block 906 where the logic waits for user input to gather an image using the camera, and then at block 908 receives such input. The logic then proceeds to block 910 where the logic gathers and image and may also, if desired, automatically without further user input actuate a light source to illuminate the field of view of the camera prior to gathering the image to illuminate the field of view for the image. From block 910 the logic moves to block 912, where the logic analyzes and/or parses the image e.g. to identify one or more objects therein (e.g. using object and/or document recognition principles and/or software).

After block 912 the logic proceeds to decision diamond 914 where the logic determines based on the analyzing at block 912 whether an object in the image that was gathered is a document. A negative determination at diamond 914 optionally causes the logic to proceed to block 916 where the logic may store the image at the device. However, an affirmative determination at diamond 914 may instead cause the logic to proceed to block 918. At block 918 the logic may do one or more of parsing the document as represented in the image to identify text in the document as represented in the image (e.g. and then automatically without further use input store the text in a text file created and stored at the device (e.g. automatically storing the new file with the text to a desktop location)), and/or convert the image of the document to a portable document format (PDF) file (e.g. and then automatically without further user input storing the new PDF file at the device (e.g. automatically storing the file to a desktop location)). In some embodiments the logic may convert the image as gathered to a PDF file, while in other embodiments (e.g. based on settings established by a user) the device may first identify borders of the document as represented in the image and remove portions of the image that comprise areas not within the borders of the document to render a modified image which is then converted to a PDF file.

After block 918 the logic may optionally continue to block 920, where the logic may direct and control the light source to illuminate the document in the field of view of the camera but to not illuminate other areas of the field of view other than the document (e.g. based on document borders identified at block 918). The logic at block 920 may thus gather yet another image of the document with the document illuminated while other portions in the field of view are not illuminated to gather an image of the document where the document is the focus of the image owing at least to the illumination while other portions not illuminated form a background relative to the illuminated document.

From block 920 the logic may revert back to block 918 and execute one or more of the actions described above in reference to block 918 on the image gathered at block 920. Before moving on in the detailed description, it is to be understood that although the example logic of FIG. 9 has been described in reference to the actions at block 918 being executed before the actions at block 920, in some embodiments the logic may proceed from an affirmative determination at diamond 914 directly to block 920, and then proceed from block 920 to block 918 if desired.

Figure 10:
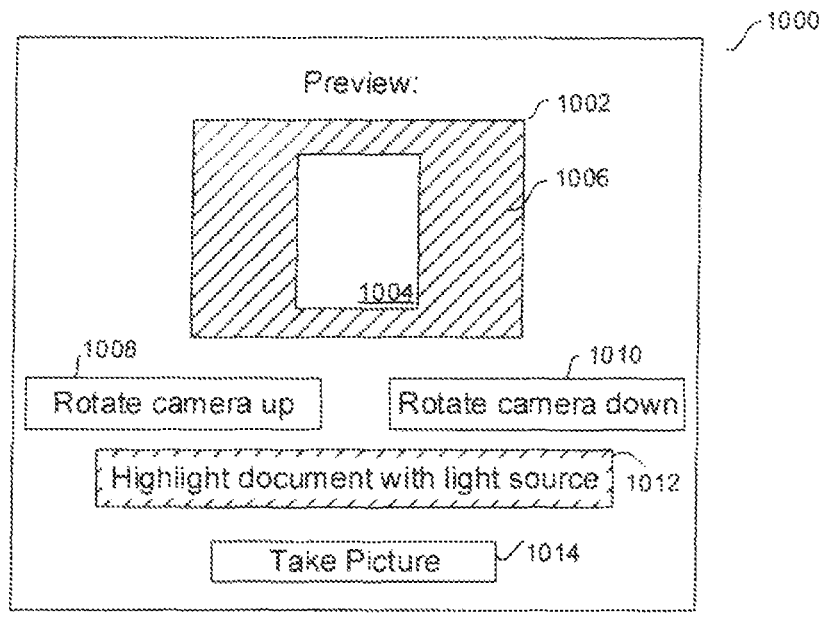
FIGS. 10 and 11 are example user interfaces (UIs) in accordance with present principles.

Continuing now in reference to FIG. 10, it shows an example UI 1000 in accordance with present principles that may be presented on a device such as the any of those described herein. In some embodiments, the UI 1000 may be presented automatically without further user input other than e.g. physically transitioning the panels of the device to a tent configuration. Regardless, the UI 1000 includes a preview window 1002 where a preview image showing the current field of view of a camera that has been actuated is shown. Note that the preview window 1002 shows a document 1004 which has been illuminated relative to a background 1006 of the field of view that is (e.g. at least substantially) not illuminated.

One or more selector elements 1008, 1010 for controlling the orientation of the camera and hence its field of view are also shown e.g. for embodiments where the camera is on a swivel as described herein and can be rotated about the axis of rotation of the swivel. However, it is to be understood that still other selector elements for controlling the field of view and/or focus (and still other effects) of the camera may be provided, such as e.g. selector elements to zoom in or zoom out from the current field of view. In any case, in the example shown a selector element 1008 is selectable to automatically rotate the camera "up" relative to its current position about an axis of rotation of a swivel on which the camera is disposed. A selector element 1010 is also shown and is selectable to automatically rotate the camera "down" relative to its current position about an axis of rotation of the swivel.

Still in reference to FIG. 10, the UI 1000 also includes a selector element 1012 that is selectable to automatically without further user input e.g. use a light source to illuminate a document identified as being in the field of view of the camera while not illuminating other portions of the field of view. It is to be understood that the shading of the element 1012 as shown indicates that the selector element 1012 has been selected, and thus as may be appreciated from the preview window 1002 the document 1004 is illuminated while the shading shown in the preview window 1002 illustrates that other portions of the field of view are not illuminated. The UI 1000 also includes a selector element 1014 which is selectable to automatically without further user input gather an image of the document in accordance with present principles.

Figure 11:
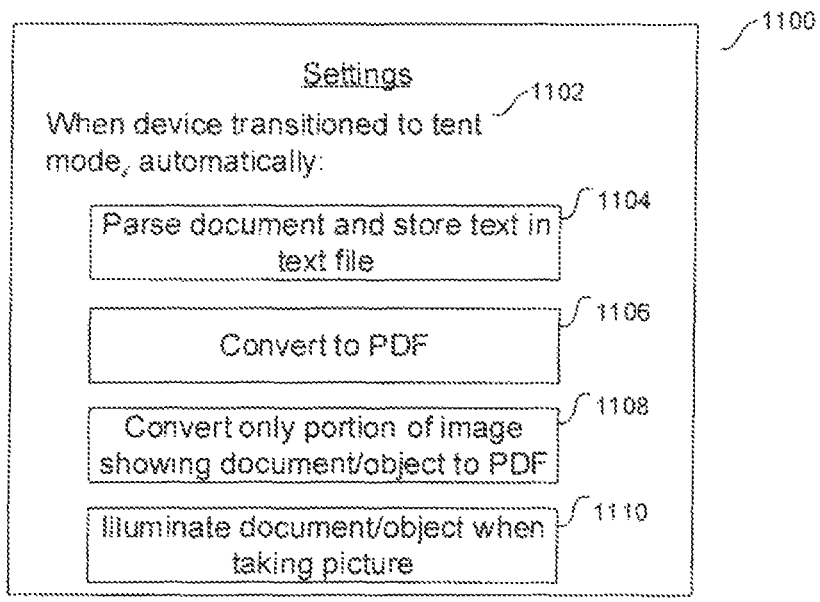

Continuing the detailed description in reference to FIG. 11, it shows an example UI 1100 in accordance with present principles that may be presented on a device such as the any of those described herein, and is understood to be for configuring one or more settings in accordance with present principles. The UI 1100 includes a prompt 1102 prompting a use to select one or more selector elements shown on the UI 1100 associated with actions to be executed automatically upon a device being transitioned to a tent configuration without further user input. Thus, FIG. 11 shows a selector element 1104 to automatically without further user input other than transitioning the device to the tent configuration parse the document for text and store the text in a text file, a selector element 1106 to automatically without further user input other than transitioning the device to the tent configuration convert an image that is gathered by a camera of the device to a PDF file, a selector element 1108 to automatically without further user input other than transitioning the device to the tent configuration convert only a portion of an image that is gathered showing a document and/or object to a PDF file, and a selector element 1110 to automatically without further use input other than transitioning the device to the tent configuration illuminate an identified document and/or object when gathering an image.

Without reference to any particular figure, it is to be understood that while various panels referenced herein are described as being coupled to each other via a hinge, it is to be understood that in some embodiments other ways of coupling the panels may be used and/or the panels maybe e.g. coupled to each other.

Also without reference to any particular figure, it is to be understood that sensors for sensing a configuration of a convertible device in accordance with present principles (e.g. providing signals representative of the device being transitioned to a laptop configuration, a tablet configuration, a tent configuration, a stand configuration, etc.) may include optical sensors (e.g. in the hinge), electromechanical sensors (e.g. in the hinge), accelerometers and/or gyroscopes (e.g. to detect orientation of the device), and/or even the cameras themselves (e.g. using object recognition to determine an orientation of a panel on which the camera is disposed relative to another portion of the device such as another panel). Proximity sensors may also be used to e.g. detect if the device is proximate to a person or a surface (e.g. on which it is disposed).

Still without reference to any particular figure, it is to be understood that in embodiments where two cameras are included on a device as described herein, and specifically when e.g. two such cameras are disposed on to and bottom edges of a panel bearing a display relative to the device being in a laptop configuration and relative to looking upright at the display in such as configuration, the camera at the top of the display owing to its positioning on the device may be relatively more suitable for e.g. video conferencing while the user at the same time provides hand gestures and/or commands (e.g. recognizable by the device) to the device using a camera on the bottom of the display near a keyboard that owing to its positioning proximate to the keyboard may be relatively more optimal for providing such gestures (e.g. in the typing zone) so that a user does not have to reposition their hands undesirably away from the keyboard rather than proximate to it. Thus, because of the positioning of the cameras, a user may video conference while still e.g. typing and/or providing hand gesture commands at a location near the keyboard where the user's hands normally would be. The same can be said for a device in a tent configuration when both cameras are oriented e.g. as shown in FIG. 6 so that video conferencing may occur using one camera while still providing hand gesture commands using another camera e.g. while a user's hands rest comfortably on a surface on which the device is disposed.

What's more, two cameras may also be used in a tent configuration such that e.g. video conferencing may take place using a camera facing outwardly away from the device (e.g. such as the cameras 510 as shown in FIG. 7) while also gathering an image of a document using a camera on a swivel oriented toward a surface (e.g. such as the camera 512 as shown in FIG. 7).

Still without reference to any particular figure, it is to be understood that still other three-dimensional objects may be imaged e.g. in a tent configuration as described herein while still e.g. manipulating a touch-enabled display to control the camera (e.g. using a camera application) or perform another function unrelated to image gathering at the device while the device e.g. gathers an image and executes one or more actions as described herein, E.g. images of receipts of business expenses, bones found at an excavation site, lab specimens, etc. may be gathered e.g. for sharing using an online conferencing service and/or file sharing application. Such images may also e.g. be projected onto a surface using a projector or shown in a webex platform.

Thus, it one aspect present principles provide for systems and methods for easily imaging, e.g. documents at a fixed focal length and position, with a fixed and/or plain background, and/or in a controlled environment where the document is steady or otherwise does not more relative to the device when imaged. Such images that are gathered may then easily be shared using the same device used to gather the images.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular DEVICE WITH CAMERA AT OR NEAR JUNCTION OF FIRST PANEL AND SECOND PANEL is herein shown and described in detail, it is to be understood that the subject matter which is encompassed by the present application is limited only by the claims.

What is claimed is:

1. A device, comprising:
   a first panel at least bearing a keyboard;
   a second panel at least bearing a display and which is coupled to the first panel at least at a junction;
   a camera disposed on the device at least substantially at the junction of the first panel and the second panel; and
   a light source on the device and other than the display, wherein the device controls the light source to illuminate at least a portion of a current field of view of the camera;
   wherein the device presents a user interface (UI) on the display at which at least one selector element is selectable to control an aspect of the current field of view of the camera, the device presenting the UI responsive to the device being physically transitioned to a predefined configuration.

2. The device of claim 1, comprising a processor and comprising a swivel element which is coupled to at least a portion of the device at least substantially at the junction, wherein the camera is disposed on the swivel element, and wherein the swivel element is controllable by the processor to alter the orientation of the camera.

3. The device of claim 1, comprising a processor and storage accessible to the processor, the storage bearing instructions executable by the processor to:
   in response to a determination that the device has been placed in the predefined configuration, power on the camera and await user input to gather at least one image using the camera.

4. The device of claim 1, wherein the instructions are further executable to:
   determine that the device has been placed in the predefined configuration at least in part based on at least one signal from at least one configuration sensor on the device.

5. The device of claim 1, comprising a processor and storage accessible to the processor, the storage bearing instructions executable by the processor to:
   power on the camera;
   in response to user input identified by the device as input to gather at least one image using the camera, gather at least one image of an object in the field of view of the camera;
   without further user input, determine that the object is a document; and
   without further user input and in response to the determination, convert the at least one image of the document to at least one portable document format (PDF) file.

6. The device of claim 1, comprising a processor and storage accessible to the processor, the storage bearing instructions executable by the processor to:
   power on the camera;
   in response to user input identified by the device as input to gather at least one image using the camera, gather at least one image of an object in the field of view of the camera;
   without further user input, determine that the object is a document;
   without further user input, identify borders of the document as represented in the image;
   without further user input, remove portions of the at least one image that comprise areas not within the borders of the document from the at least one image to render a modified at least one image; and
   without further user input, convert the modified at least one image of the document to at least one portable document format (PDF) file.

7. A device, comprising:
   a first rectangular panel at least bearing a keyboard;
   a second rectangular panel at least bearing a display and which is coupled to the first panel at a junction;
   a first camera disposed on the second rectangular panel at a first longitudinal side of the second rectangular panel opposite a second longitudinal side of the second rectangular panel bordering the junction;
   a second camera disposed at least substantially at the junction; and
   a light source on the device and other than the display, wherein the device controls the light source to illuminate an object that is recognized by the device and is in a current field of view of the second camera, the device controlling the light source to not illuminate at least one other area of the current field of view of the second camera;
   wherein the device presents a user interface (UI) on the display at which at least one selector element is selectable to control an aspect of the current field of view of the second camera, the device presenting the UI responsive to the device being physically transitioned to a predefined configuration of the first rectangular panel relative to the second rectangular panel.

8. The device of claim 1, wherein the device controls the light source to illuminate an object recognized by the device but not at least one other area of the current field of view of the camera.

9. The device of claim 1, wherein the device actuates the camera to gather at least one first image, identify an object in the at least one first image, project light from the light source to illuminate the object but not illuminate other areas in the current field of view of the camera, and gather at least one second image of the object as illuminated by the light source.

10. The device of claim 1, wherein the UI comprises a selector element that is selectable to control the light source to illuminate an object recognized by the device but not illuminate at least one other area in the current field of view of the camera.

11. The device of claim 10, wherein the UI comprises an area presenting a preview image of the current field of view of the camera while the object is illuminated.

12. The device of claim 10, wherein the UI comprises at least one selector element that is selectable to rotate the camera relative to the portion of the device on which the camera is disposed to control the current field of view of the camera.

13. The device of claim 7, wherein the UI comprises a selector element that is selectable to control the light source to illuminate the object but not at least one other area in the current field of view of the second camera.

14. A method, comprising:
  presenting a user interface (UI) on a display of a device, the UI comprising at least a first selector element that is selectable to control an aspect of a current field of view of a camera, the UI being presented responsive to the device being physically transitioned to a predefined configuration; and
  controlling the current field of view of the camera based on selection of the first selector element.

15. The method of claim 14, wherein the method comprises:
  responsive to determining that the device has been placed in the predefined configuration, powering on the camera and awaiting user input to gather at least one image using the camera.

16. The method of claim 15, wherein the method comprises:
  determining that the device has been placed in the predefined configuration at least in part based on at least one signal from at least one configuration sensor on the device.

17. The method of claim 14, wherein the method comprises:
  powering on the camera;
  responsive to user input identified as input to gather at least one image using the camera, gathering at least one image of an object in the field of view of the camera;
  without further user input, determining that the object is a document; and
  without further user input and responsive to the determining, converting the at least one image of the document to at least one portable document format (PDF) file.

18. The method of claim 14, wherein the method comprises:
  powering on the camera;
  responsive to user input identified as input to gather at least one image using the camera, gathering at least one image of an object in the field of view of the camera;
  without further user input, determining that the object is a document;
  without further user input, identifying borders of the document as represented in the image;
  without further user input, removing portions of the at least one image that comprise areas not within the borders of the document from the at least one image to render a modified at least one image; and
  without further user input, converting the modified at least one image of the document to at least one portable document format (PDF) file.

19. The method of claim 14, wherein the device comprises:
  a first panel at least bearing a keyboard;
  a second panel at least bearing the display and which is coupled to the first panel at a junction; and
  the camera.

20. The method of claim 19, wherein the device comprises:
  a processor; and
  a swivel element which is coupled to the device at the junction, wherein the camera is disposed on the swivel element, and wherein the swivel element is controllable by the processor to alter the orientation of the camera.

* * * * *